United States Patent [19]
de Chair

[11] 3,971,209
[45] July 27, 1976

[54] GAS GENERATORS

[76] Inventor: Rory Somerset de Chair, St. Osyth's Priory, St. Osyth, Essex, England

[22] Filed: July 16, 1974

[21] Appl. No.: 489,063

Related U.S. Application Data

[63] Continuation-in-part of Ser. No. 327,180, Jan. 21, 1973, abandoned.

[30] Foreign Application Priority Data

Feb. 9, 1972  United Kingdom............... 6158/72

[52] U.S. Cl............................. 60/39.14; 60/39.35
[51] Int. Cl.² ...................... F02C 3/16; F02C 3/14
[58] Field of Search............ 60/39.35, 39.27, 39.74, 60/39.14, 39.34, 39.36, 39.75, 39.67; 415/268

[56] References Cited
UNITED STATES PATENTS

| | | | |
|---|---|---|---|
| 2,579,049 | 12/1951 | Price | 60/39.35 |
| 2,630,676 | 3/1953 | Seifert | 60/39.35 |
| 2,630,678 | 3/1953 | Pratt | 60/39.74 R |
| 2,784,551 | 3/1957 | Karlby et al. | 60/39.08 |
| 2,931,168 | 4/1960 | Alexander | 60/39.27 |
| 2,959,919 | 11/1960 | Chiera | 60/39.14 |
| 3,037,351 | 6/1962 | Stoltz | 60/39.35 |
| 3,740,948 | 6/1973 | Kellett | 60/39.5 |

FOREIGN PATENTS OR APPLICATIONS

| | | | |
|---|---|---|---|
| 164,359 | 3/1956 | Australia | 60/39.35 |
| 1,041,444 | 9/1966 | United Kingdom | |

*Primary Examiner*—Carlton R. Croyle
*Assistant Examiner*—L. J. Casaregola
*Attorney, Agent, or Firm*—Baldwin, Wight & Brown

[57] ABSTRACT

Improvements in a gas generator having a "rambine" rotor on which compression, combustion and expansion take place. The improvements include a counter rotating compressor rotor with blades shaped to impart a component of velocity in the direction of rotation of the compressor rotor, hence increasing the whirl velocity of inlet air to the rambine rotor.

Preferred embodiments include a plurality of compressor rotors for successively increasing the relative whirl velocity; a rambine rotor having a combustion zone with increasing cross-sectional area over an ignition delay distance for obtaining higher heat release using a weaker shock wave; a zero work rotor with sets of blades spaced by an annular combustion chamber; an ignition stabilizer and starting nozzle arrangement, and apparatus for controlling the gas generator over a range of power settings.

25 Claims, 23 Drawing Figures

3,971,209

GAS GENERATORS

FIELD OF INVENTION

This Specification is a continuation in Part of Application Ser. No. 327,180 (now abandoned) filed on Jan. 26th, 1973 and relates to improvements in gas generators and more particularly to gas generators employing a rotor on which compression, combustion and expansion take place.

There is no accepted general term in the art of gas turbine engines to cover the class of rotor having compression combustion and expansion thereon and it is proposed herein to apply the term "rambine" to all such classes of rotors both existing and conceivable. A rambine rotor will generally be characterised in that it carries compression and expansion blading and that there is provision for combustion to take place between the compression and expansion blading. In this specification and the appended claims the expression "Rambine Rotor" is intended to be given the above meaning.

Considering a simple case of a rambine rotor where no inlet guide vanes are provided, if air flows into the rotor with a velocity $c$ and the blade velocity is $u$ then, if a velocity triangle is constructed having two sides representing the velocities $c$ and $u$, and their directions, the velocity of the air relative to the rotor $W_{in} = c - u$.

If the relative inlet velocity $W_{in}$ is supersonic then the air flow is diffused by the inlet air passage to subsonic speed relative to the rotor. The air is thus compressed. Fuel is injected into the compressed air stream and the fuel/air mixture burns in the combustion zone. The outlet blade passages expand the exhaust gases for discharge at a supersonic velocity $W_{out}$ relative to the rotor.

DESCRIPTION OF PRIOR ART

A rambine rotor is known, for example, from U.K. Patent Specification No. 1,041,444. U.K. Patent Specification No. 1,041,444 shows a rambine rotor supporting radial blades. The blades are shaped to define inlet air passages which form supersonic diffusers for compressing inlet air to the rotor. Further downstream of the inlet air passages, the blades define passages which form combustion chambers. Downstream of the combustion chamber the blades define passages for expanding exhaust gases. Fuel is introduced into the airstream through holes in the blades adjacent the inlet ends of the combustion chambers.

The volume required for complete combustion of the mixture in the combustion passage depends on the pressure at which combustion occurs. The greater this pressure, the smaller and hence shorter the space required for combustion. If the rotor is to be made short enough for use in an aircraft, then a compression ratio of at least 50:1 may be required. This ratio requires the relative velocity $W_{in}$ to be highly supersonic, for example, more than Mach 3.0. In this case the rotor must rotate at such a high speed that the centrifugal stresses in the blades exceed practical limits.

SUMMARY OF INVENTION

The invention relates to improvements in gas generators having rambine rotors. One improvement comprises the provision of a counter-rotating compressor rotor on the inlet side of the rambine rotor. The compressor rotor has at least one set of radial blades shaped to impart a component of velocity to its exit air stream in the direction of its rotation. The relative whirl velocity of air entering the rambine rotor is thereby increased without the need to drive rambine rotor at impractical speeds.

In a preferred embodiment a plurality of compressor rotors are provided each with a respective set of radial blades for successively increasing the whirl velocity of inlet air relative to the rambine rotor. By this means the relative inlet Mach number of the various compressor rotors is reduced.

The rambine rotor can comprise a first set of compression blading and a second set of expansion blading, the two sets of blading being axially spaced to define an annular chamber. The combustion zone is within this annular chamber. The first set of blades define the inlet air passages which are shaped to cause supersonic compression. The area of the annular chamber diverges between the trailing edges of the first set of blades and a position at which ignition of the air/fuel mixture occurs. This embodiment enables a weaker shock wave, situated upstream of the ignition point, to be used to allow the same heat release as a stronger shock wave. Suitably the first set of blades include holes which define exits of the fuel dispensing means and these holes can be located either between the trailing edges of the blades and a position upstream at which a shock wave occurs, or better still in the trailing edges of the blades.

Other methods of injecting fuel into the rambine rotor may be utilised for example, nozzles may be provided in a shroud surrounding the rambine rotor or in the hub of the rambine rotor upstream of the combustion zone, alternatively fuel may be admixed with the airstream upstream of the rambine rotor. The second set of blades define exhaust gas passages for expanding the exhaust gases.

A suitable starting arrangement for the gas generator includes nozzles for directing a stream of gases, under high pressure, against the expansion blades which then act as a turbine to drive the rambine rotor. Suitably, the nozzles are connected to a chamber where, for example, an oxidant and a fuel burn, or a monopropellant (such as hydrogen peroxide) reacts, to produce a stream of hot gases. This injection of gases drives the rambine rotor in order to start the gas generator. The hot gases facilitate ignition of the main air/fuel mixture from the inlet of the gas generator.

Preferably, means are provided to stabilize the position of ignition within the annular chamber. Advantageously, the starting nozzles, when provided, form parts of a circumferential baffle. Alternatively the stabilizing means can be a notch or a step in a fixed shroud.

In an alternative arrangement the compression and expansion blading extends across the surface of the rambine rotor to form a plurality of discrete combustion spaces each combustion space lying downstream of a compression passage and upstream of an expansion passage and between one blade and the next adjacent blade on the rambine rotor. The area defined between the inlet passages, the hub of the rambine rotor and the radially outer shroud increases from a position where, in use, a normal or effectively normal shock wave occurs, to a position where, in use, ignition delay, terminates. Thus fuel may be injected into the rambine rotor sufficiently upstream of the position where in use ignition delay terminates that, at this position, spontaneous ignition of the fuel air mixture occurs by virtue of the temperature downstream of the normal or effectively normal shock wave. The ignition delay distance corresponds to that distance downstream of the normal shock wave that allows formation of free combustion radicals, such as OH, O and H, within the fuel air mixture.

It is an object of this invention to reduce the speed of a rambine rotor whilst maintaining the relative air inlet velocity required for obtaining the pressure for efficient combustion.

Another object of the invention is to modify the combustion behaviour in a gas generator so that a weaker shock wave can be used and still allow the same heat release as in the known rambine rotor described above.

Another object of the invention is to provide means to facilitate starting a gas generator.

A further object of the invention is to show means for controlling and varying the power output from a gas generator constructed in accordance with the present invention.

Other objects and advantages of the invention will become apparent in the accompanying description of various embodiments of the invention.

Embodiments of the invention will now be described by way of example only and with reference to the accompanying drawings 1 through 16 as described above.

Figure 1:
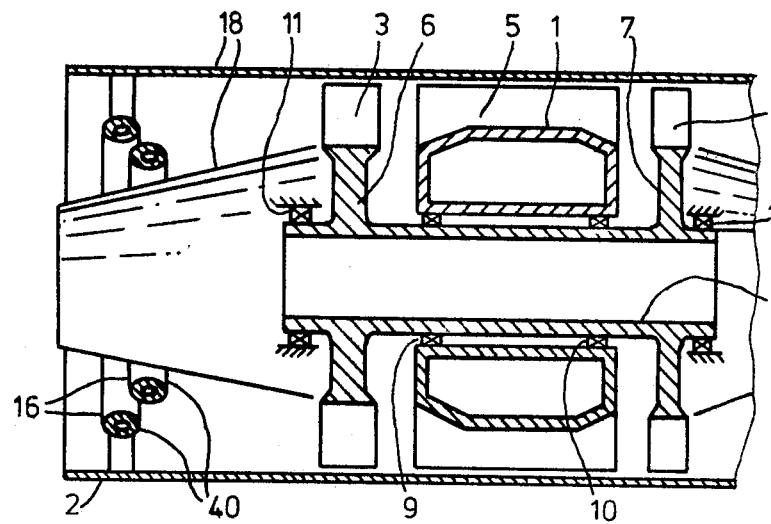
FIG. 1 is a simplified sectional view through a gas generator according to the invention.
Figure 2:
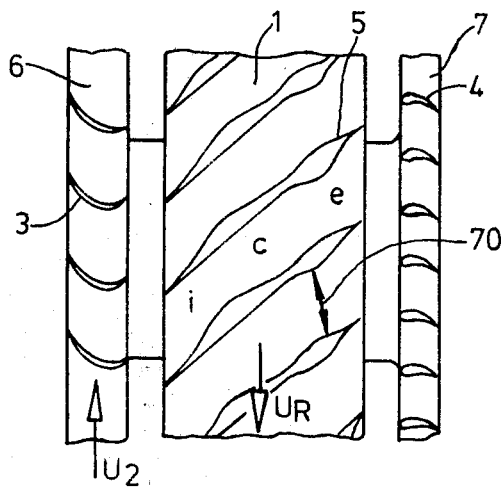
FIG. 2 is a developed view of the rotors of FIG. 1.

Referring now to FIGS. 1 and 2 a first embodiment of the invention is shown wherein a rambine rotor 1, on which compression, combustion and expansion take place, is rotatably mounted within a housing 2.

Upstream of the rambine rotor is a compressor 6 drivingly connected by a shaft 8 to a turbine 7 situated downstream of the rambine rotor. The rambine rotor 1 is rotatably mounted on bearings 9 and 10 which are supported on the shaft 7 which is itself mounted in bearings 11 and 12 which are supported by struts (not shown) to the housing 2.

Rambine rotor 1 has a plurality of radial blades 5, adjacent pairs of which are shaped to define inlet passages (i), combustion spaces (c) and exhaust passages (e). The inlet passages (i) are shaped to form supersonic diffusers for compressing air and the exhaust passage (e) are formed to expand exhaust gases from the combustion spaces (c).

Compressor rotor 6 and turbine rotor 7 each have a plurality of radial blades 3 and 4 respectively of opposite curvature. The exhaust gas stream from rambine rotor 1 drives turbine rotor 7 in the opposite direction to rambine rotor 1 and hence compressor rotor 6 is counter-rotated relative to rambine rotor 1. The blades 3 of the compressor rotor 6 are cambered so as to impart a velocity component to the exit air stream in the direction of rotation of the blades 3.

Duct 18, partly defined by housing 2, defines an inlet to the housing at the upstream end thereof. Fuel dispensing means, suh as fuel rings 16 are disposed at the entrance of duct 18 whereby fuel is induced or injected from jets 40. Alternatively, fuel dispensing means can be provided with exit holes in the sides of the blades 5, known per se, for example from United Kingdom Patent Specification No. 1,041,444.

Figure 3A:
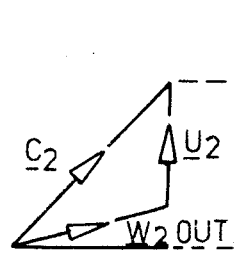
FIGS. 3A–3B shows velocity diagrams for explaining the operation of the gas generator of FIGS. 1 and 2.

The mode of operation of the gas generator shown in FIGS. 1 and 2 will now be described with reference to the velocity diagram of FIG. 3. An air/fuel mixture enters the blade passages of compressor rotor 6 and is partly compressed before leaving the exits of the blade passages. The cambered blades 3 impart a component of relative velocity in the direction of the rotation of compressor rotor 6, i.e. the direction of rotation of blades 3. The mixture therefore leaves the compressor rotor 6 with an absolute velocity $c_2$ which is greater than the rotational velocity of the blades 3. This is shown in the diagram of FIG. 3A in which $w_{2\ out}$ is the relative velocity at the compressor exit, $u_2$ is the velocity of blades 3; and $c_2$ is the absolute velocity at the compressor rotor exit.

Figure 3B:
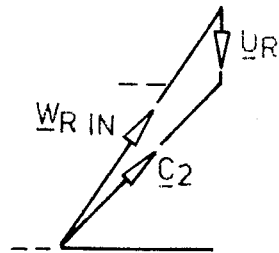

The diagram of FIG. 3B shows that the compressor rotor 6 allows the rambine rotor 1 to rotate at a lower speed $u_R$ while still maintaining the same relative inlet velocity $w_{in}$. $w_{in}$ is the designed relative inlet velocity of the rambine rotor and it is envisaged that $w_{in}$ will be from about two to three times the sonic velocity at the rambine inlet. Because the fuel/air mixture is compressed by the compressor rotor 6, less compression is required in the inlet passages (i) of rambine rotor 1. However, the function of the compressor rotor 6 is primarily to produce a higher whirl velocity and the pressure rise across the compressor is of secondary benefit. If the design pressure recovery of the compressor section of the rambine rotor is very high then a correspondingly high whirl velocity is required at the exit of the compressor rotor 6, the compressor rotor will have to rotate at a very fast speed and its relative inlet Mach number might be excessive from the blade aerodynamics point of view. In order to reduce this high relative inlet Mach number to the compressor whilst still maintaining a high relative inlet Mach number at the rambine rotor inlet, the embodiment of FIGS. 4 and 5 is preferred.

Figure 4:
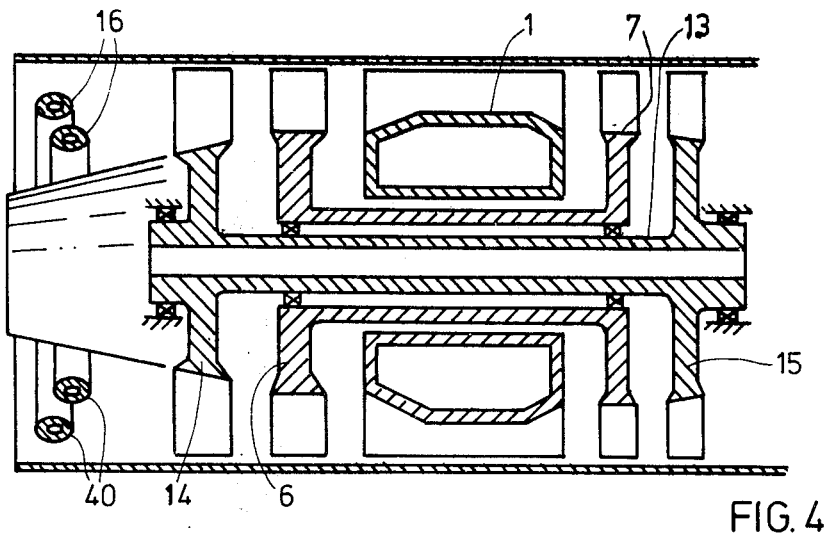
FIG. 4 is a simplified elevational cross-section through a gas generator according to another embodiment of the invention.
Figure 5:
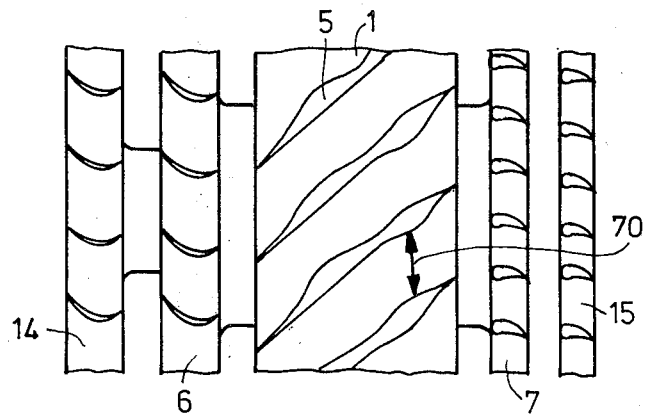
FIG. 5 is a side elevational view through the rotors of the engine of FIG. 4, FIGS. 6A–6F are velocity diagrams for explaining the operation of the embodiment shown in FIGS. 4 and 5.

In FIGS. 4 and 5, similar reference numerals identify similar components where there is a counterpart in FIGS. 1 and 2. It can be seen that an additional turbine driven compressor rotor is employed in this embodiment, the compressor rotor 14 being connected by a shaft 13 to a turbine rotor 15. Compressor rotor 14 rotates in the same direction as compressor rotor 6 but at a slower speed.

Accordingly the whirl velocity is built up in two stages and the velocity diagrams of FIGS. 6A – 6F illustrate how this is achieved.

An axially flowing airstream with absolute velocity $c_1$ is incident on the compressor rotor 14 which is rotating with a peripheral speed $u_1$ which may be considered as a tangential velocity $u_1$ thus the relative inlet velocity is, in vector terms, $$c - u_1 = w_{1\ in} \qquad \text{Equ}^n (1)$$

The blade by virtue of its curvature changes $w_{1\ in}$ to $w_{1\ out}$ and therefore the absolute velocity downstream of the compressor rotor 14 is, $$w_{1\ out} + u_1 = c_2 \qquad \text{Equ}^n (2)$$

This airstream is now incident on the compressor rotor 6 which is rotating with peripheral speed $u_2$ in the same direction as rotor 14 and thus has a relative inlet velocity, $$w_{2\ in} = c_2 - u_2 \qquad \text{Equ}^n (3)$$

The curvature of the blading of the compressor or rotor 6 modifies $w_{2\ in}$ to $w_{2\ out}$ and thus the absolute velocity downstream of the compressor rotor 6, $c_3$, equals the sum of the relative outlet velocity $w_{2\ out}$ and the rotor speed $u_2$, $$c_3 = w_{2\ out} + u \qquad \text{Equ}^n (4)$$

The airstream is now incident on the rambine rotor 1 which is rotating in the opposite direction to the compressor rotors 14, 6 with peripheral speed $u_R$. Thus the relative inlet velocity $w_{R\ in}$ is given by, $$c_3 - u_R = w_{R\ in} \qquad \text{Equ}^n (5)$$

(Because $u_R$ is in the opposite direction to $u_1$ and $u_2$, $w_R$ $_{in}$ is a very large relative inlet velocity with a very high whirl velocity equal to the resolved component $w_{RT}$ but it will be appreciated that this very high whirl velocity is accompanied by a relatively low axial velocity component ($w_{RA}$) and that it has been produced using speeds $u_1$, $u_2$, $u_R$, (for the rotors 14, 6, 1 respectively) that are themselves all relatively low.

Thus the Mach numbers through the compressors rotors 14, 6 may be kept at about M. 1.5 which is sufficiently low to avoid excessive difficulties in the design of the blading. The Mach number is given by dividing the local velocity by the local speed of sound which changes as the square root of the local static temperature.

The velocity diagram for the situation at the exit of compressor rotor 6 is similar to that shown in FIG. 3.

Figures 6A, 6B, 6C, 6D, 6E:
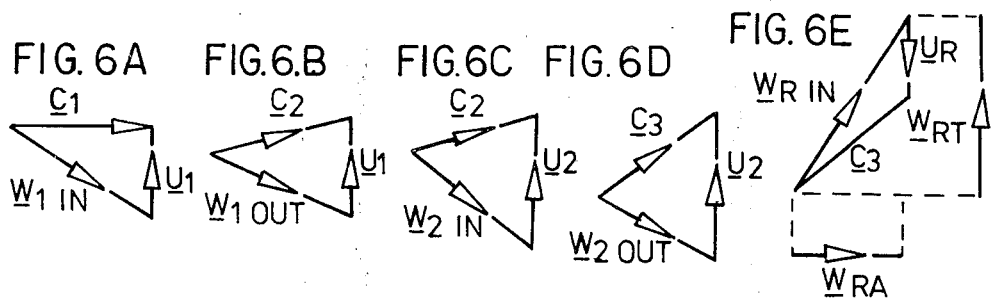
Figure 6F:
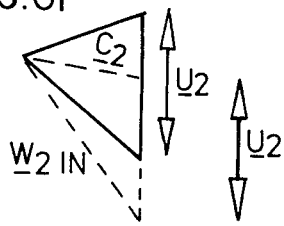

The effect of compressor rotor 14 can be seen in FIG. 6F. The dotted lines show $C_2$ and $W_{2\ in}$ without a compressor rotor 14, compared with the full lines with compressor rotor 14.

Figure 7:
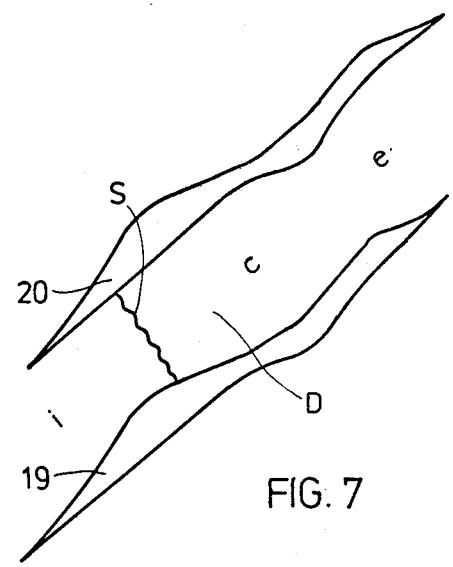
FIG. 7 is a plan view showing the shape of rotor blades in another embodiment of the invention.

In a further embodiment of the invention, utilising fuel addition upstream of or in the vicinity of the compressor rotor, the blade passages of the rambine rotor are shaped to reduce combustion losses. Referring to FIG. 7 blades 19 and 20 define an inlet passage (i), a combustion chamber (c) and an exhaust passage (e). The inlet passages are shaped for supersonic compression such that the supersonic compression process is terminated by a normal shock wave, or effectively normal shock wave, S. The temperature behind the shock wave S is high enough to start a chemical ignition delay process. During this process chemical reactions occur in the fuel/air mixture which cause a build up of radicals such as OH, O and H. During this process very little heat release occurs. At the end of the ignition delay process, these radicals rapidly reach a peak concentration and after ignition, the radical concentrations decay by the action of recombination reactions. It is during this last process that most of the heat release occurs.

In accordance with the invention, the area of each blade passage is increased between the position at which shock wave S occurs and a position at which the ignition delay process is completed. In other words, the area of each blade passage increases, from the position of the shock wave over a distance equal to the ignition delay distance. This can be achieved by designing the blade passages to diverge from a point just upstream of the most upstream position that shock wave S can occupy, to the most downstream position that the ignition point can occupy over the operating range of the gas generator. This arrangement differs from known systems that employ standing detonation waves in blade passages because such known systems do not attempt an area increase during the ignition delay process. The advantage of the increase of area during the ignition delay process is that a weaker shock wave S can be used for the heat release. The reason for this is as follows.

The amount of heat that can be added to a constant area stream depends on the Mach number at the start of the heating. The lower the subsonic Mach number, the more heat can be added before the flow chokes. In the case without a change of area behind the shock wave, a low subsonic Mach number at the start of the heating must be achieved by having a high supersonic Mach number flowing into the shock so that there is a low subsonic Mach number behind it. If a weak shock is used with a low supersonic stream flowing into it, then a high subsonic Mach number exists behind this weak shock and the flow area must be increased to reduce the Mach number before ignition and the onset of heat release, if as much heating is to be possible as for the case of using a strong shock wave. The use of a weaker shock results in smaller shock losses.

After diverging, the passage can have a straight portion followed by a converging and then diverging expansion section, i.e. between (c) and (e).

If fuel is added to the air stream in the inlet passages (i), this can be done through holes provided in the walls of the blades downstream of the shock wave S, however the point of addition of the fuel must be sufficiently upstream of the intended ignition point to allow formation of the radicals OH, O and H as previously described if spontaneous ignition is still desired, otherwise ignition will take place in a turbulent flame stabilised downstream of the fuel injection holes.

Further embodiments are shown in FIGS. 8A through 8D. FIG. 9 is a section, on a constant radius, through a rambine rotor 25 and this figure is generally applicable to each of the embodiments 8A through 8D.

Figure 8A:
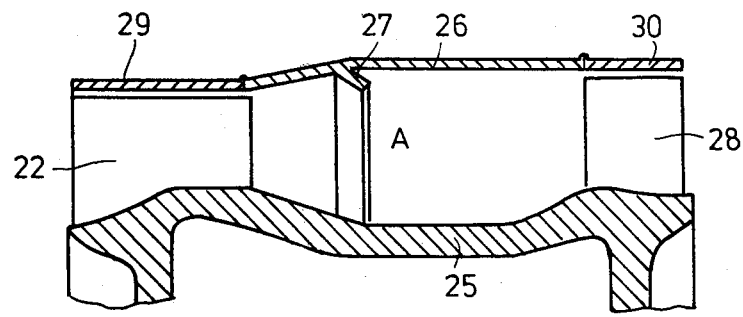
FIGS. 8A–8D are part-sectional views through alternative rotor constructions.
Figure 8B:
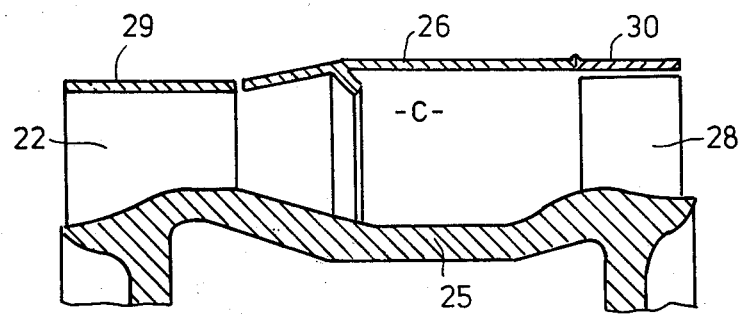
Figure 8C:
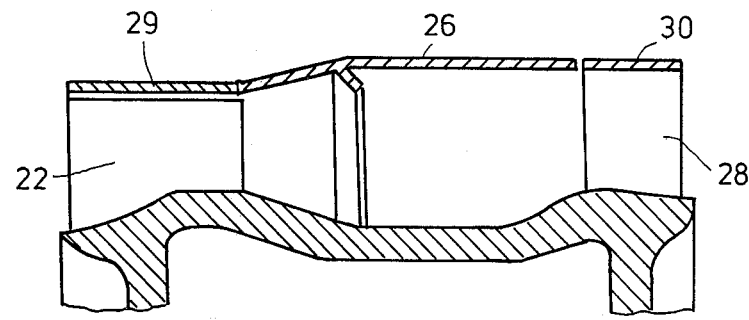
Figure 8D:
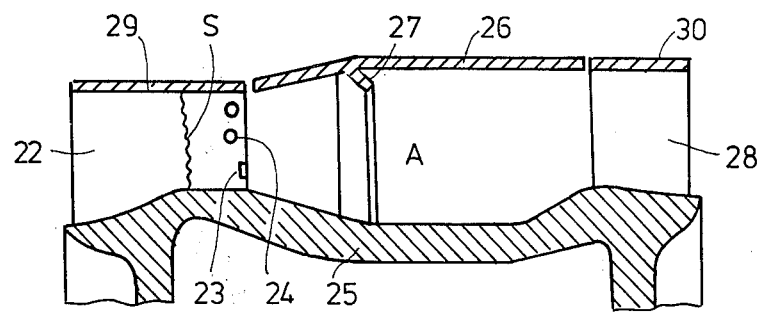
Figure 9:
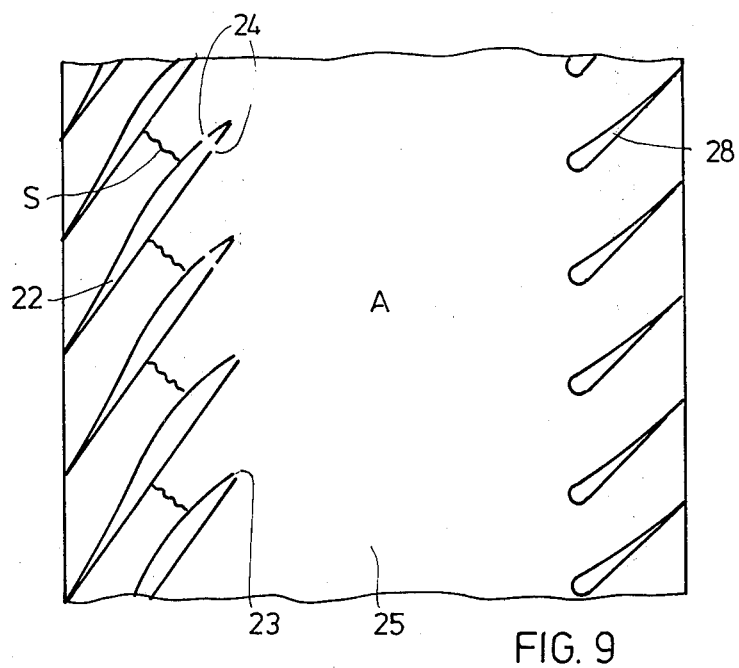
FIG. 9 is a section at constant radius of the rotor used in the embodiment of FIGS. 8A–8D.

Referring to FIG. 8A, the rambine rotor 25 has two rows of radial blades 22 and 28 spaced by an annular chamber A. The generator housing comprises fixed shroud parts 29, 26 and 30. In FIG. 8B shroud part 29 is fixed to blades 22 and rotates with them, shroud parts 26 and 30 being fixed and thus not rotatable with the rambine rotor. In FIG. 8C shroud part 30 is fixed to blades 28 and rotates with them, shroud parts 29 and 26 being fixed. In FIG. 8D shroud parts 29 and 30 are fixed to respective blades 22 and 28 for rotation therewith, shroud part 26 being fixed. When either, or both, of shroud parts 29 and 30 are fixed to their respective blades for rotation therewith, seals not shown but well known per se are provided between the fixed shroud part 26 and the rotatable shroud part or parts. It will be noted that shroud part 26 has not been shown to be rotatable with the rambine rotor, this is because the high temperatures in the combustion space would make the outer shroud too weak to withstand the centrifugal stresses. Netherthless it is concievable that materials or cooling techniques could be devised which would permit the shroud part 26 to rotate with the rambine rotor.

In general, chamber A is defined by the surfaces of revolution of the trailing and leading edges of blades 22 and 28 respectively, the hub of the rambine rotor and the fixed shroud position 26. As seen in the side section in FIGS. 8A – 8D, chamber A diverges at its upstream end and converges at its downstream end. Blades 22 define inlet air passages which are shaped to cause supersonic compression of the inlet air, and may for example be as shown in my co-pending patent application entitled "Improvements in Gas Turbine Engines", which supersonic compression is terminated by a normal shock wave S. The inlet air passages diverge downstream of the shock wave S towards the trailing edges of the blades 22.

Fuel dispensing means is provided by passageways through the rambine rotor 25 terminating in exits preferably at the trailing edge of each blade 22 (exits 23) or between the trailing edge and shock wave S (exits 24). Fuel is injected from exits 23 or 24 into the air stream. Fuel injections holes may also be provided in the hub, i.e. the floor, of the blade passages or from nozzles (not shown) but which are arranged to supply fuel through the shrouds 26 or 29. Injection holes at the trailing edges of blades 22 are particularly advantageous because the fuel jets do not interfere with subsonic diffusion (deceleration) in the last part of the inlet blade passages.

Heat release takes place in the annular chamber A. A circumferential wall baffle 27 can be provided on the inside surface of shroud 26, the baffle having a wedge shape as shown, or being a step or notch in the shroud, to stabilise the position of ignition. Downstream of baffle 27, annular chamber A is defined by a substantially straight portion but the divergent portion of annular chamber A may continue for a short distance downstream of baffle 27. If, at the end of combustion i.e. at the end of the straight portion of chamber A, the flow is subsonic, then chamber A can converge towards the row of blades 28. Blades 28 are shaped to expand and to turn the exhaust gas stream so that it leaves the rambine rotor with the same angular momentum as it entered with the exception of a small excess required to overcome mechanical and frictional losses.

Fuel can be injected into the rambine rotor passages to cool the blades 22, 28 and the hub of rotor 25, by being supplied via passageways in the rambine rotor 25 adjacent heated surfaces which the fuel cools by convection.

Figure 10:
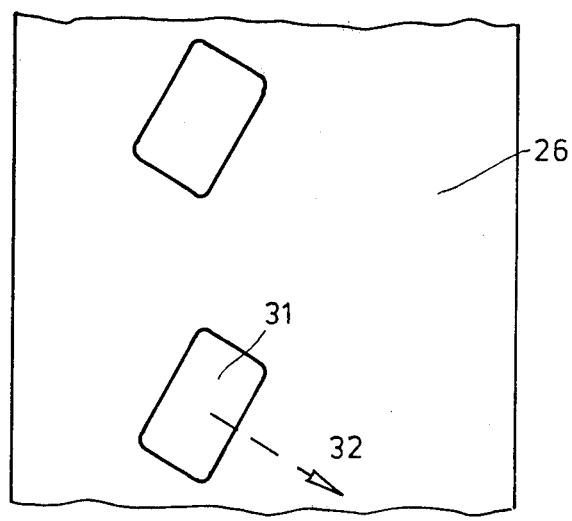
FIG. 10 shows part of an interior surface of a housing of a gas generator illustrating exit nozzles of a starting arrangement for the gas generator.
Figure 11:
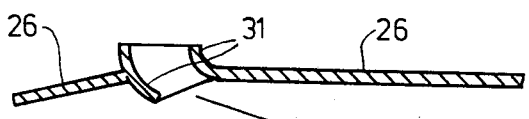
FIG. 11 is a part sectional view of one of the nozzles shown in FIG. 10.
Figure 12:
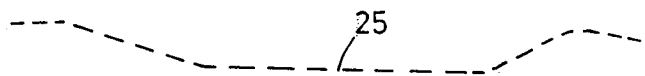
FIG. 12 is a part sectional view through a modified starting nozzle.
Figure 12:
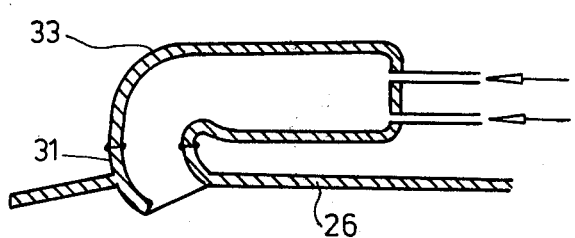

The above embodiment can include starting means by providing one or more nozzles 31 set into the shroud 26 at circumferential intervals. Nozzles 31 exhaust into the annular chamber A, jets of gas from the nozzles being directed towards the blades 28. An example is shown in FIGS. 10 and 11. The nozzle 31 ejects a jet of gas in the direction of the arrow 32, which can be inclined radially inwards and tangentially from the axial direction (the axis of the rotor). The nozzles are supplied with high pressure gas, either from a single or several gas generators, solid or liquid fuel, or each nozzle can be fitted with its own small combustion chamber 33 (FIG. 12) which feeds hot high pressure gas to the nozzle 31. The combustion chamber and nozzle could be constructed as a single unit but the chamber is still regarded as fixed to the nozzle. The combustion chambers are fueled with liquid or solid fuel, preferably liquid supplied through pipes under pressure from pumps or pressurised tanks. The gas jets from the nozzles 31 entrain some of the main air/fuel mixture in the annular space and impinge on the exit blades 28 so that the blade row 28 acts as a turbine, and the rambine rotor is made to rotate. The hot gas jets from the nozzles 31 may serve to ignite the main mixture flowing through the annular space. When combustion of the main mixture is satisfactory and the various rotors of the engine are rotating fast enough i.e. the engine has become self sustaining, the fuel supply to the combustion chambers 33, or the gas generators supplying the nozzles 31, can be cut off and the engine has started.

Those parts of the nozzles 31 which protrude into the annular space form segments of the wall baffle. Accordingly the wall baffle on the inside surface of the shroud 26 will consist of segments like 27 and segments like the inward protruding part of the nozzle 31. Whatever form the ignition stabiliser takes, parts of it can be the protruding positions of the starting nozzles.

Figure 13:
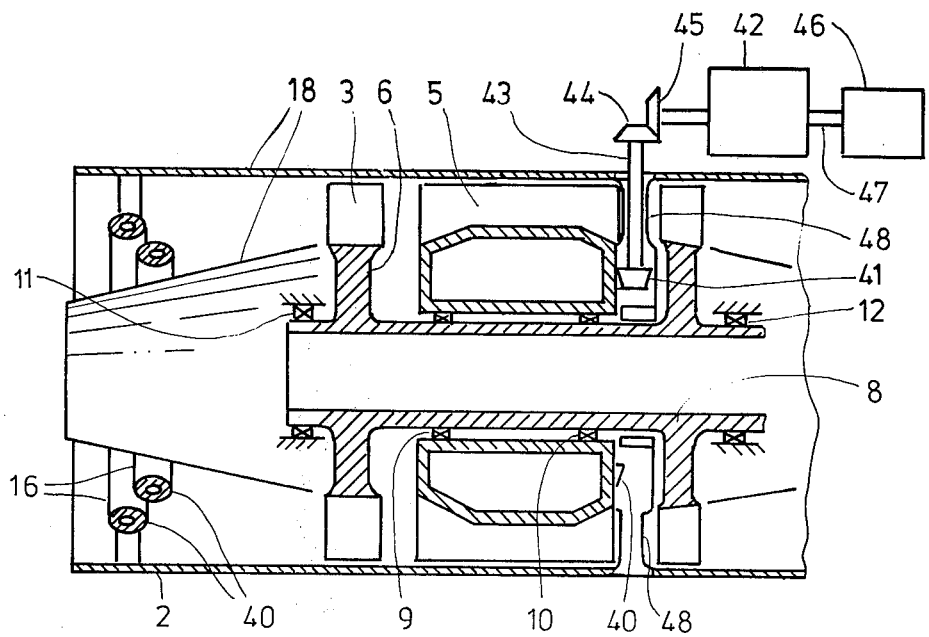
FIG. 13 is a schematic view of a gas generator showing a rotor driving accessories.

In general it is not considered expedient to extract external work from the rambine rotor but rather to use it as a source of hot high pressure gas. However reference to FIG. 13 will show that it is contemplated that a mechanical drive may be taken from the rambine rotor 1, FIG. 13 is generally similar to FIG. 1 but it will be seen that a crown wheel 40 is affixed to the rambine rotor and that the crown wheel meshes with a bevel pinion 41.

The bevel pinion 41 drives a constant speed drive unit 42 via a shaft 43 and two crossed bevel gears 44, 45. The constant speed drive then drives accessories 46 via the shaft 47.

In the figure it will be noted that the shaft 43 passes through the centre of a vane 48 which may also serve as a stator vane in the turbine section of the engine or could be utilised to support, via a bearing one or more of the rotors. In a further embodiment (not shown) each stator vane 48 could be made rotatable about to respective longitudinal axis to provide a control parameter for the engine.

Figure 14:
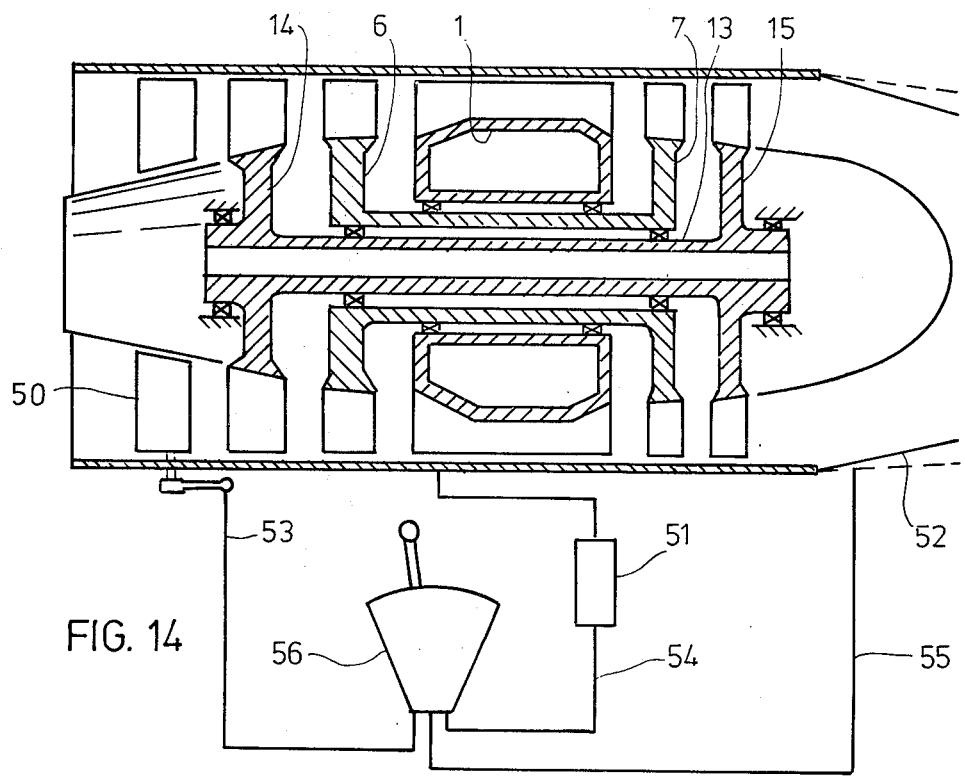
FIG. 14 is a schematic view showing means for controlling a gas generator.

Turning now to FIG. 14 there is shown basically the engine of FIG. 4 provided with means for controlling the operation of the engine. It will be understood that when the gas turbine engine of FIG. 4, or any of the other engines herein described, is installed in an aircraft it will be necessary to adjust the power output from the engine to correspond to the flight envelope of the aircraft.

Accordingly the engine of FIG. 14 is provided with variable inlet guide vanes 50, a fuel flow controller 51 and a variable area petal nozzle 52. The variable inlet guide vanes 50 the fuel flow controller 51 and the variable area petal nozzle are all connected via respective control lines 53, 54, 55 to the throttle quadrant 56.

Consider a rotor with no external torques acting on it, like the rambine, of FIGS. 2, 5.

Since there is a choked throat at 70, the exit relative Mach number $M_{R\ out}$ and the angle $\alpha_{R\ out}$ the existing flow makes with the rambine rotor, are fixed and not effected by conditions ahead of the throat.

Now if the axial component of Mach number at entry to the rambine rotor ($M_{R\ in}$) can be held constant, by a method to be disclosed later, then it can be shown mathematically that the rotor speed $U_R$ will adjust itself to keep the Mach number relative to the rotor inlet, $M_{R\ in}$, and the angle $\alpha_{R\ in}$ the incident flow makes relative to the rambine rotor constant as the whirl component of the incident stream changes. To achieve this it is necessary for the ratio of the relative stagnation temperature at rotor exit to that at rotor inlet be held constant, by controlling the fuel flow. Accordingly, if the absolute inlet whirl is reduced, for whatever reason, and the fuel flow is adjusted correctly, then the rotor will accelerate. In short, in order to maintain constant $M_{R\ in}$ and $\alpha_{R\ in}$, imcrements of whirl at inlet to the rotor will be compensated for by increments in the same direction of rotor speed. If the incident whirl is in counter rotation to the rotor, (as the exit stream from compressor rotor 6 will be) then an increase in the absolute value of that whirl will result in a fall in rotor speed, and vice-versa. If the incident whirl were in co-rotation with the rotor, then increased in the absolute value of that whirl would result in a rise in rotor speed and vice-versa.

Consider now, the system between the inlet of compressor rotor 6, FIG. 5 and the exit of the driving turbine 7.

Since the rambine has no net effect on the whirl of the gas, and since no external torques are acting, the system under consideration is a zero torque system and will operate in the manner described for the rambine, with respect to changes in incident whirl. This time, the incident whirl is that of the exit stream from compressor 14.

Finally, the whole system, from the inlet of compressor 14 to exit of turbine 15 is clearly a zero torque system. Thus, provided that, at the entries to the various rotors, the axial component of Mach numbers can be held constant (not necessarily the same constant for each rotor) then the relative Mach numbers and angles at entry to (and exit from) these rotors will remain constant as the incident whirl to the first compressor rotor (which should be counter whirl) is changed by controlling the inlet guide vane angle and fuel flow.

It will thus be appreciated that as the inlet guide vanes 50 are swung away from the axial position, to one of increasing counter rotation to the first compressor rotor and the fuel flow is correspondingly reduced (as will be shown) then the compressor rotors 14 and 6 and associated turbines will slow down to maintain constant their respective relative inlet Mach numbers. Reference to the velocity triangles of FIG. 6, viewed as Mach number triangles shows that this slowing down of the compressors will result in a reduced absolute whirl at rambine inlet, necessitating, as already shown, an increase in rambine speed.

Thus in short as the inlet guide vanes 50 are turned away from the axial, the compressor rotors slow down and the rambine speeds up. During this process the blades all remain at their design Mach number and incidence.

It will now be shown that as the inlet guide vanes 50 are swung away from the position in which they permit axial flow, lower engine power conditions are produced.

Since the relative Mach numbers to the rotors are remaining constant, it follows that the ratio of the stagnation temperature relative to the rambine inlet to the static temperature at inlet to the first compressor rotor 14 must remain constant. However, as the inlet guide vanes are moved away from away from axial, the absolute speed of the air at inlet to the first compressor 14 increases due to the addition of a whirl component. Accordingly given constant ambient conditions, its static temperature decreases. Hence the stagnation temperature relative to the rambine inlet falls as explained just previously. Now, as explained earlier, the ratio of the stagnation temperatures relative to the exit and inlet of the rambine must remain constant. Hence if the relative inlet stagnation temperatures is reduced, then so must be the relative exit stagnation temperature. This requires a reduced fuel flow.

This reduction of fuel flow is the first reason why engine power reduces as inlet guide vanes 50 are turned away from axial.

The second reason is that, the mass flow will be reduced as the inlet guide vanes are turned.

The method of maintaining the axial Mach numbers to the rotors constant will now be explained.

For every point of operation in the mode described, a mass flow is implied by the velocity triangles. Hence for each operating point, the required mass flow can be claculated. To ensure that this mass flow is in fact realised, a variable area choked throat such as a power turbine stator row or a petal nozzle 52 can be provided. Its area is therefore adjusted to pass just that mass flow which maintains the axial Mach numbers throughout the gas generator at their design values.

Thus it is possible by using the embodiment of FIG. 14 to control the engine so that as the power increases, and the temperature in the rotating rambine rises, the rambine speed falls. This is completely contrary to the behaviour of conventional gas turbines where as the temperature of hot rotating parts rises, so does the rotational speed and hence the stresses.

It will be appreciated by those skilled in the art that all embodiments and variations of the present invention may be likewise controlled will attendant advantages.

Additionally, the blade rows of the gas generator remain on design over a range of power settings, promoting peak aerodynamic efficiency in this range, which could include an engine power variation by a factor of two or more.

It will be understood that engines having high full power pressure ratios will also have a relatively high pressure ratio at low power conditions. Thus the ability to achieve high pressure ratios not only enables high specific power outputs but also improves the combustion efficiency of the engine at low power conditions, for example at engine idle and ground running, this leads to a beneficial reduction in carbon monoxide emission from the engine at low power conditions when often these emissions are generally at their worst.

It will be readily understood by those skilled in the art that many permutations and variations of the embodiments herein disclosed may be made without departing from the spirit of the invention.

I claim:

1. In a gas generator including housing means having an air inlet and an exhaust gas outlet, bearing means mounted inwardly of said housing means, a rambine rotor; said rambine rotor being rotatably mounted on said bearing means and having a plurality of blades, each of said blades and a next adjacent one of said blades defining an inlet passage for compressing air induced from said air inlet, there being an axially extending region downstream of said inlet passages, and means for dispensing fuel into said axially extending region for combustion with air received from said inlet passages, said rambine rotor having means defining outlet passages for expanding the products of combustion; and wherein there is further provided:
  a. a plurality of compressor rotors upstream of the inlet side of said rambine rotor, each compressor rotor having at least one set of radial blades, said blades being shaped so as to impart a component of velocity to an exit gas stream from the compressor rotor in the direction of rotation of said compressor rotors, that compressor rotor adjacent the rambine rotor being in direct communication therewith,
  b. bearing means for rotatably supporting said compressor rotors, and
  c. means for rotating successive compressor rotors at successively faster rotational speeds in a like direction and in the opposite direction to the direction of rotation of the rambine rotor.

2. A gas generator according to claim 1 and wherein said means for dispensing fuel to the rambine rotor includes holes in the said compression blading.

3. A gas generator according to claim 1 and wherein said means for dispensing fuel into the combustion space is located upstream of said compressor rotors and wherein the combustion space increases in cross-sectional area from a position where in use a shock wave occurs to a position where, in use, ignition delay terminates whereby said shock wave is stabilized and said fuel is burnt in said combustion zone.

4. A gas generator according to claim 1 wherein said housing means includes a shroud disposed radially inwardly of the rambine rotor.

5. A gas generator according to claim 4 wherein said shroud includes a part fixed to the plurality of blades and to said means defining said outlet passages for rotation together therewith.

6. A gas generator according to claim 21 wherein said shroud includes first and second parts with said first shroud being fixed part to said plurality of blades for rotation together therewith and said shroud second part being fixed relative to said housing means adjacent said means defining the outlet passages.

7. A gas generator according to claim 4 wherein said shroud includes first and second parts, and wherein said second shroud part is fixed to said means for defining said outlet passages for rotation together therewith, and said first shroud part is in fixed relation to the housing means adjacent said plurality of blades.

8. A gas generator according to claim 4 including a plurality of nozzles arranged in said radially outer shroud for discharging gas in the direction of said outlet passages so as to rotate said rambine rotor, said nozzles being provided for starting the gas generator.

9. A gas generator according to claim 8 in which each nozzle is fitted to means defining a combustion chamber for producing hot, high-pressure gas for said discharge in the direction of the outlet passages.

10. A gas generator according to claim 1 and wherein there is provided means for driving accessories from the rambine rotor.

11. A gas generator according to claim 1 and wherein there is provided control means for controlling the gas generator to provide a range of power outputs therefrom.

12. A gas generator according to claim 11 and wherein said control means includes a plurality of inlet guide vanes upstream of the or each compressor rotor, a valve for regulating the fuel supply to the engine, means for varying the turbine exhaust area of the engine and a throttle lever connected to the engine for simultaneously varying the angle of attack of the inlet guide vanes, regulating the fuel supply valve and varying the turbine exhaust area of the engine.

13. A gas generator according to claim 1 wherein said means defining said outlet passages are a second plurality of blades spaced axially and downstream from the first mentioned plurality of blades.

14. A gas generator according to claim 13 wherein said housing means includes a shroud disposed radially outwardly of the rambine rotor.

15. A gas generator according to claim 14 wherein said shroud includes a part fixed to one of said pluralities of blades for rotation therewith.

16. A gas generator according to claim 14 wherein said shroud includes separate parts separately fixed to said pluralities of blades for rotation therewith.

17. In a gas generator including housing means having an air inlet and an exhaust gas outlet, bearing means mounted inwardly of said housing means, a rambine rotor having a plurality of blades defining a combustion zone, said rambine rotor being rotatably mounted on said bearing means, said blades also defining inlet passages for compressing air induced from said inlet and defining outer passages for expanding gases received from said combustion zone, and means for dispensing fuel into said combustion zone, the improvement comprising:
  i. a plurality of compressor rotors on the inlet side of said rambine rotor, each of said compressor rotors having at least one set of radial blades, and said compressor blades being shaped so as to impart a component of velocity to an exit gas stream from the compressor rotors in the direction of rotation of said compressor blades, and said compressor rotors being arranged for rotation in the same direction and in direct communication with one another for successively increasing the whirl velocity of the inlet air relative to said rambine rotor,
  ii. bearing means for rotatably supporting said compressor rotors, and
  iii. means for independently rotating all of said compressor rotors in a like direction and opposite to the direction of rotation of said rambine rotor with successive compressor rotors rotating at different and successively high speeds to successively increase the whirl velocity of the inlet air.

18. In a gas generator including housing means having an air inlet and an exhaust gas outlet, bearing means mounted inwardly of said housing means, a rambine rotor having a plurality of blades defining a combustion zone, said rambine rotor being rotatably mounted on said bearing means, said blades also defining inlet passages for compressing air induced from said inlet and outlet passages for expanding gases received from said combustion zone, and means for dispensing fuel into said combustion zone, the improvement comprising:
  i. a compressor rotor on the inlet side of said rambine rotor, said compressor rotor having at least one set of radial blades, said compressor blades being shaped so as to impart a component of velocity to an exit gas stream from the compressor rotor in the direction of rotation of said compressor blades,
  ii. bearing means for rotatably supporting said compressor rotor, and
  iii. means for rotating said compressor rotor in a direction opposite to the direction of rotation of said rambine rotor, said housing means including a fixed shroud, said rambine rotor blades being formed by first and second axially spaced sets of blades which, together with said fixed shroud, define an unobstructed annular chamber free of blades, said annular chamber including said combustion zone;
  said first set of blades (a) defining said inlet passages, (b) being shaped to cause supersonic compression of said inlet air within said inlet passages and (c) having holes defining exits of said fuel dispensing means, and
  the cross-sectional area of said annular chamber diverging between trailing edges of said first set of blades and a position at which, in use, ignition of said mixture occurs.

19. A gas generator comprising:
  a. housing means having an air inlet and an exhaust gas outlet,
  b. bearing means mounted inwardly of said housing means,
  c. said housing means including a fixed shroud, a rambine rotor having first and second sets of blades, said blade sets being axially spaced to define, together with said fixed shroud, an unobstructed annular chamber free of blades, said first set of blades defining air inlet passages and being shaped to cause supersonic compression of said inlet air within said air inlet passages, the cross-sectional area of said annular chamber diverging between trailing edges of said first set of blades and a position at which, in use, ignition of an air/fuel mixture occurs,
  d. fuel dispensing means including exit holes in the trailing edges of said first set of blades for admitting fuel to said annular chamber,
  e. a compression rotor on the inlet side of said rambine rotor, said compressor rotor having at least one set of radial blades, said compressor blades being shaped so as to impart a component of velocity to an exit gas stream from the compressor rotor in the direction of rotation of said compressor blades,
  f. bearing means for rotatably supporting said compressor rotor, and
  g. means for rotating said compressor rotor in a direction opposite to the direction of rotation of said rambine rotor.

20. For use in a gas generator, a rambine rotor assembly comprising a rambine rotor and a radially displaced outer shroud, said rambine rotor including first and second axially spaced sets of blades which together with said shroud define an unobstructed annular chamber free of blades, said annular chamber including a combustion space, said first set of blades cooperating with said shroud to define inlet passages, said annular chamber having a position at which fuel introduced therein ignites, the cross-sectional area of said annular chamber diverging between trailing edges of said first set of blades and said position at which ignition of fuel occurs.

21. A rambine rotor assembly according to claim 20 and wherein said radially outer shroud is fixed to said first and second sets of blades for rotation together therewith.

22. A rambine rotor assembly according to claim 20 and wherein said radially outer shroud comprises two parts, a first part fixed to said first set of blades for rotation together therewith, and a second part disposed adjacent to and separate from said second set of blades.

23. A rambine rotor according to claim 20 and wherein the radially outer shroud comprises two parts, a first part disposed adjacent to and separate from said first set of blades, and a second part fixed to said second set of blades for rotation together therewith.

24. A rambine rotor according to claim 20 and incorporating means for supplying fuel to said combustion space, said means comprising holes in said first set of blades.

25. A rambine rotor according to claim 20 and incorporating a plurality of nozzles arranged in said radially outer shroud for discharging gas in the direction of and so as to drive said second set of blades, said nozzles being parts of means for starting rotation of the rambine rotor.

* * * * *